April 28, 1970  P. NYROP  3,508,994

METHOD FOR PRODUCING MEMBRANE SEPARATION DEVICES

Filed July 7, 1966  3 Sheets-Sheet 1

PER NYROP
INVENTOR.

BY J. Dennis Malone

ATTORNEY.

April 28, 1970 P. NYROP 3,508,994
METHOD FOR PRODUCING MEMBRANE SEPARATION DEVICES
Filed July 7, 1966 3 Sheets-Sheet 2

PER NYROP
INVENTOR.

BY
ATTORNEY.

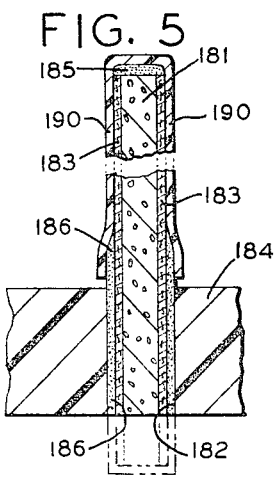
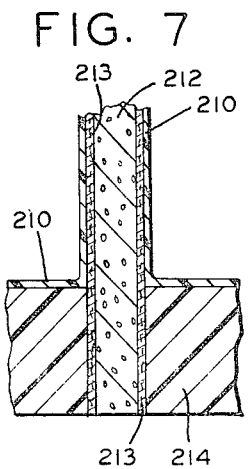
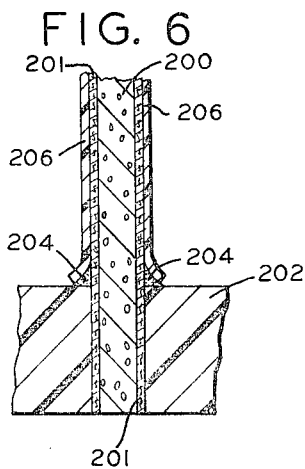
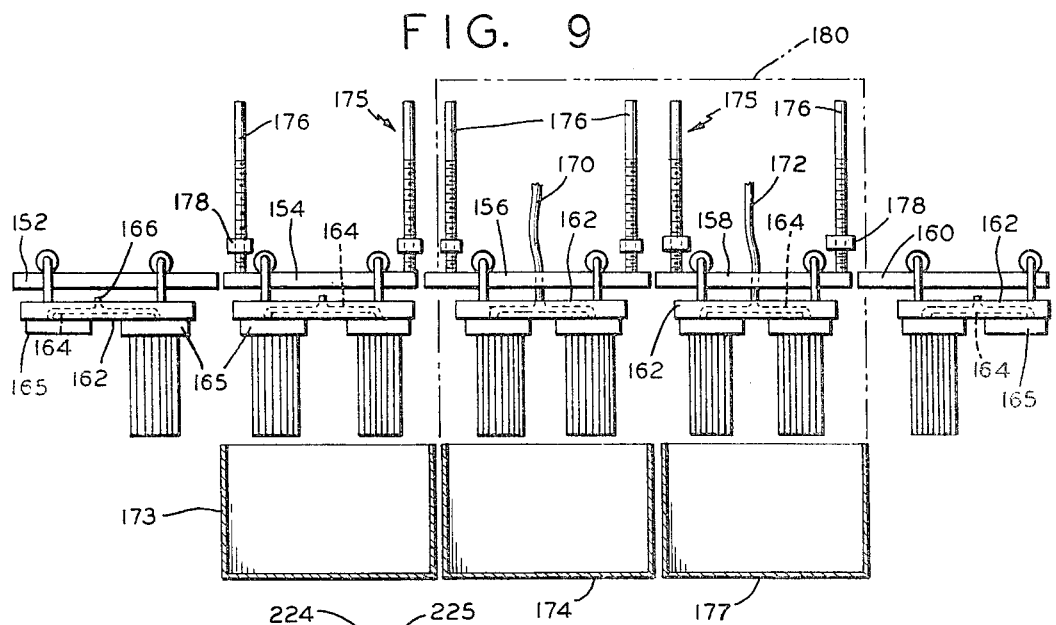
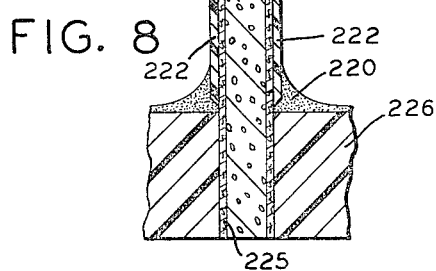
PER NYROP
*INVENTOR.*
ATTORNEY.

United States Patent Office 3,508,994
Patented Apr. 28, 1970

3,508,994
METHOD FOR PRODUCING MEMBRANE SEPARATION DEVICES
Per Nyrop, Norwalk, Conn., assignor to Dorr-Oliver Incorporated, Stamford, Conn., a corporation of Delaware
Filed July 7, 1966, Ser. No. 563,592
Int. Cl. B32b *31/12;* B44d *1/032*
U.S. Cl. 156—280                                13 Claims

ABSTRACT OF THE DISCLOSURE

The present invention relates to new methods for producing membrane separation devices and to the devices thus produced. The method involves the preassembly of a plurality of membrane supporting members into a substantially-fixed closely-spaced arrangement followed by a subsequent temporary immersion of this assembly into a bath of a membrane-forming liquid. The plurality of pre-assembled membrane supports are arranged to facilitate contact of all the surface of the membrane supports with the membrane-forming liquid and to facilitate drainage of excess liquid upon withdrawal of the assembly from the bath. Suitable treatment of the liquid coating thus deposited forms the membranes in situ in the preassembled device.

---

The present invention relates to devices for use in accomplishing membrane-separation processes and to methods and apparatus for making such devices.

Membrane separations, such as practiced by electrodialysis, ultrafiltration, and reverse osmosis, are known techniques for separating solutions and suspension into distinct fractions. To accomplish such separations on a practical scale, it is necessary to present large areas of the operative membrane to the fluid to be treated, This can be accomplished in a compact manner by assembling a plurality of spaced-apart membrane surfaces within a housing which is appropriately provided with inlets, outlets, and passageways to direct the feed under pressure to the membrane surfaces and to withdraw the resulting fractions from the unit.

It has been found that membranes have a limited operational life, apparently because the micro pores in the membrane become plugged by molecules or particles and because of coating or caking on the feed surface of the membrane. These effects together with other causes, some of which are not fully understood, reduce the flux rate through the membrane. Although partial remedial measures to unplug, clean, and restore the membrane may be available, it ultimately needs to be replaced. Therefore, it is critical to the economic usefulness of a membrane-separation process that the membranes can be readily and inexpensively replaced without utilizing specialized skills.

Heretofore, the presentation of substantial areas of membrane has been accomplished in devices which require great skill and time to successfully assemble. For example, as shown in U.S. Patent 2,987,472 to Kollsman, is is known to make up membrane-presentation units utilizing membranes which have been conventionally made by either continuous or sectional casting techniques such as commonly used in the production of plastic films. Such pre-formed membranes are assembled with support members, appropriate seals, and fluid-directing elements to form the unit. However, it should be noted that membranes are thin and fragile and are therefore difficult to handle in making such an assembly. Furthermore, the are substantial sealing problems involved in such a unit. For example, it has been found that attempts to create a seal in a membrane-presentation unit by contacting the membrane with seals such as O-rings result in stress points in the membrane. These stress points are characterized by reduced rejection characteristics as may be shown by appropriate dye tests.

Therefore, it is a primary object of the present invention to produce low-cost membrane-separation devices which facilitate membrane replacement and which obviate the problems presented by the prior art.

To accomplish this object, the present invention provides a technique by which membrane units can be constructed without manipulation of the fragile films. Specifically, the invention contemplates immersing a membrane-supporting structure in a membrane-forming liquid so as to create a continuous coating of the liquid, and therefore the resulting membrane, directly upon the membrane-supporting surfaces of the structure. In one form of the invention, a plurality of sheets of a porous, fluid-conducting material are asssembled in an impermeable partition of suitable configuration to form a cartridge. This integrated assembly is dip-coated so as to form a layer of the liquid upon the opposite surfaces of the porous sheets. The cartridge configuration must be designed to ensure contact of the membrane-forming liquid with all portions of the membrane-supporting surfaces and to ensure adequate drainage of excess solution upon withdrawal of the cartridge from the dipping bath. The coatings thus formed are treated in appropriate manner to create in situ continuous membranes having the desired selective-permeability characteristics. The completed cartridge is utilized in a suitable housing to form an operative membrane-separation unit.

According to one embodiment of the present invention, the porous support upon which the membrane is formed is a laminated sheet structure having an open porous core lamina to readily conduct effluent internally along the plane of the sheet. The opposite sides of this core lamina are covered by membrane-supporting outer laminae having relatively fine pores to support the liquid membrane-forming coating to be place thereon.

As the membrane of the present invention is deposited in place in liquid form, it conforms to any imperfections in the supporting structure thereby avoiding the prior art situation wherein precast membranes were improperly supported at such imperfections and were apt to rupture under operating feed pressures. Further, since the membrane is cast in place, it not only adheres to the porous support surfaces but also forms an intimate interface with any other component of the integrated assembly which it contacts, for example the impermeable partition. Therefore, by an appropriate selection of materials, a bonding or adhesion between the membrane and such other cartridge components can be obtained to produce simple, effective seals within the cartridge without introducing stress points in the membrane. Additionally, because the membrane is applied in unique manner to a preassembled structure, the present invention permits membrane renewal by stripping off or dissolving the old, plugged membrane and then recoating the supporting structure with fresh membrane.

Accordingly, other objects of the present invention include:

(1) The provision of improved methods for making membrane-presentation units wherein the membrane is formed directly upon membrane supporting surfaces of a preassembled unit thereby obviating the need for any handling of the membrane;

(2) The provision of improved methods for making membrane-presentation units wherein the necessary seals between the membranes and the other components of the unit can be effectively formed without creating stress points in the membranes;

(3) The provision of apparatus for making membrane cartridges in which the membranes are dip-coated upon preassembled cartridge structures;

(4) The provision of improved membrane-presentation units wherein the seals between the membranes and other components of the cartridge are created by a cast overlap of the membrane upon such components;

(5) The provision of improved membrane units which permit removal of old membrane and application of fresh membrane without disassembly of the unit;

(6) The provision of membrane units having an improved laminated, porous, membrane-supporting structure in intimate bonded contact with the membranes.

These and other objects will appear from the following description and the appended claims when read in conjunction with the accompanying drawings wherein:

Figure 1:
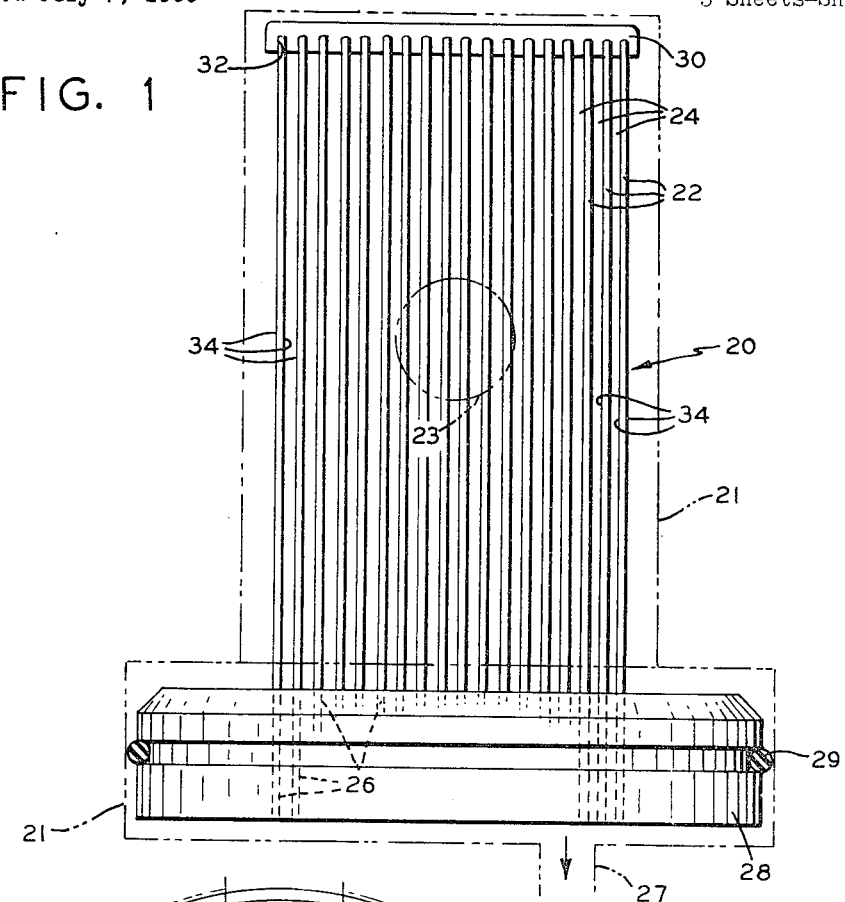
FIGURE 1 is a side view of a membrane-presentation unit according to the present invention.

FIGURES 5, 6, 7, and 8 are enlarged sectional views showing various sealing techniques according to the present invention.

FIGURE 9 is a schematic showing of an apparatus for practicing the present invention.

THE MEMBRANE CARTRIDGES

Referring now to the drawings in greater detail, FIGURES 1 to 4 show cartridge embodiments which, in accordance with the present invention, are assembled as integral units before the delicate membranes are applied. The membranes are subsequently formed on the exposed surfaces of porous fluid-conducting portions of the assembled structure by immersing the cartridge in a membrane-forming liquid.

Figure 2:
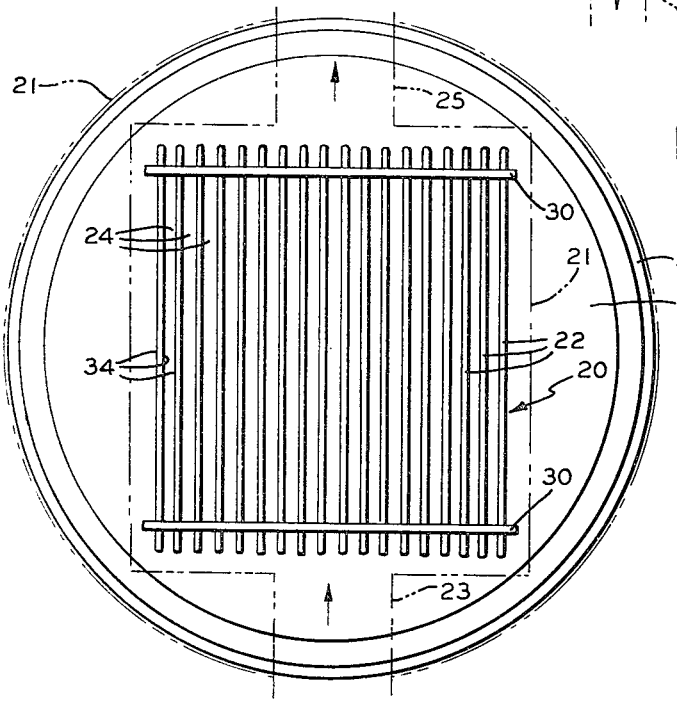
FIGURE 2 is an end view of the unit of FIGURE 1.

Considering first the embodiment of FIGURES 1 and 2, a cartridge 20 is shown disposed in a suitable housing 21, which is schematically shown in dot-dash lines since the housing, per se, is not critical to the present invention. Housing 21 is provided with a feed inlet 23, a concentrate outlet 25, and an effluent space outlet 27. Cartridge 20 includes a plurality of membrane-supporting members which may preferably be in a form of sheets or plates 22 disposed in a stack so as to define relatively narrow passageways or channels 24 therebetween. Plates 22 are porous and have interconnected interstices to conduct liquids internally along the plane of the plates. Plates 22 are, in a preferred embodiment, a paper laminate, as fully described below. However, other porous support materials such as sintered, fused, or bonded plastics, metals, or ceramics and other fibrous materials could be used in the present invention.

An end portion 26 of each plate 22 extends through an impermeable partition or header 28. Header 28 is provided with an O-ring 29 engaging housing 21 to seal feed channels 24 from effluent outlets 27. The opposite ends of the porous plates are retained in spaced-apart relationship by a strip spacer 30 which has notches 32 to fit over the ends of the porous sheets.

The portions of the cartridge thus far described in detail are first assembled as an integral unit and are subsequently dip-coated, as fully described below, to cover the exposed surfaces of the porous sheets with membranes 34.

Figure 3:
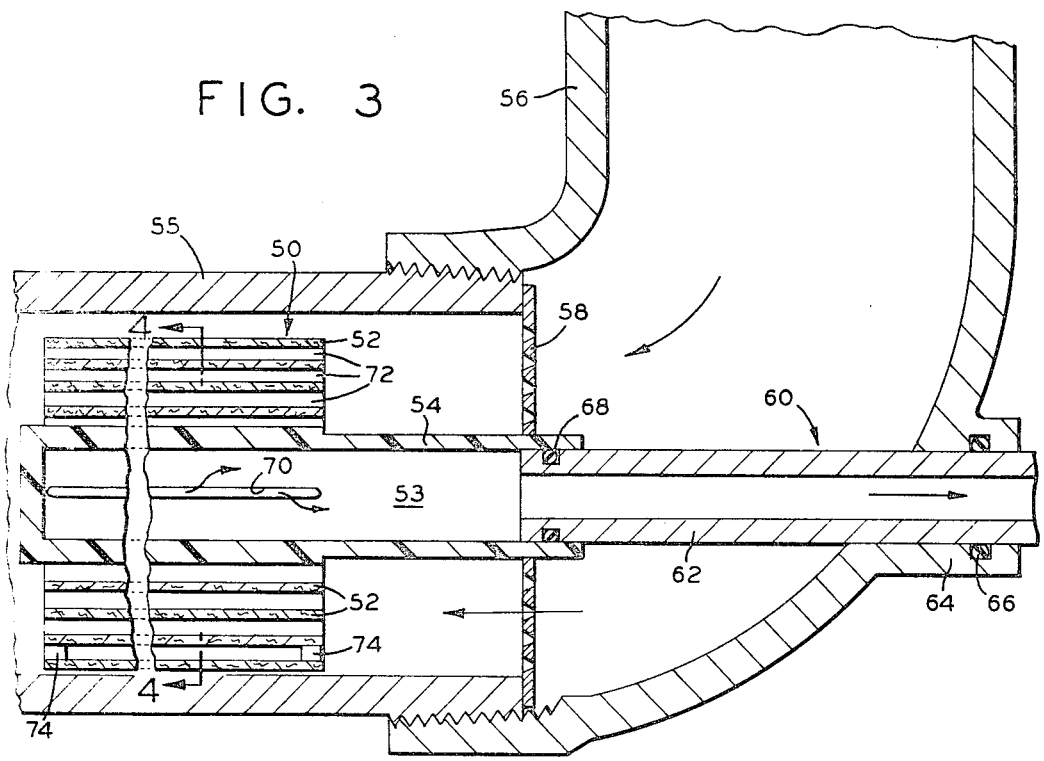
FIGURE 3 is a longitudinal section taken through a membrane unit according to another embodiment of the invention.
Figure 4:
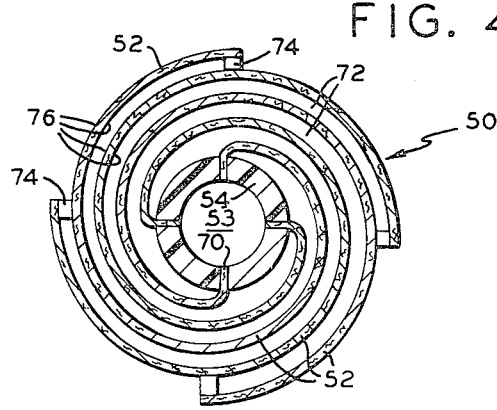
FIGURE 4 is a transverse section of the cartridge of the unit of FIGURE 3 taken substantially on line 4—4.

In the embodiment of FIGURES 3 and 4, a cartridge 50 incorporates membrane-supporting members or sheets 52 which are spirally configured and have an inner end extending through an impermeable partition in the form of a closed-end tube 54 encompassing a central effluent space 53. As shown, this cartridge is utilized in a generally cylindrical housing 55 which may be a section of pipe. The housing may be provided with an appropriate feed introduction section 56 having a screen 58 to distribute the feed and to prevent any oversize particles in the feed from clogging cartridge 50. Feed section 56 is further provided with appropirate conduit structure 60 to communicate with the effluent tube 54. This conduit structure includes a tube 62 extending through feed section 56 at a boss 64 having an O-ring seal 66. Tube 62 is sealed with respect to effluent tube 54 by an O-ring 68.

Considering the cartridge 50 is greater detail, a plurality of spirally-shaped, porous, fluid-conducting sheets 52 are inserted in longitudinal slots 70 formed in effluent tube 54. The spaces or channels 72 between the sheets may be maintained by pad-shaped spacers 74 located between the outer corners of each spiral sheet and the adjacent sheet.

In this cartridge embodiment, spiral sheets 52, central tube 54, and spacers 74 are all assembled as an integral unit, and subsequently membranes 76 are applied by immersion to the exposed surfaces of the porous sheets outside of the effluent tube 54.

MEMBRANE COATING APPARATUS

Referring now to FIGURE 9, one apparatus 150 for carrying out the process of the present invention is schematically shown. Dipping apparatus 150 comprises a plurality of functional stations or rail sections 152, 154, 156, 158, and 160 supporting a plurality of wheeled carriages 162. Carriages 162 are adapted to mount assembled cartridge structures, such as those described above, for dipping a membrane-forming bath. Each carriage 162 is provided with internal passageways 164 leading to one or more cartridge retainers 165. The retainers are adapted to sealingly mount the cartridges on the carriage with the effluent spaces of the cartridges in communication with passageways 164 of the carriages. Each carriage passageway 164 has an opening 166 adapted for connection to conduits 170 and 172 provided at certain sections of the rail system for purposes fully described below.

Rail sections 154, 156, and 158 are arranged to lower the respective carriage and cartridges supported thereby into respective baths 173, 174, and 177. To accomplish this lowering or dipping function, rail sections 154, 156, and 158 may be supported by vertical screw assemblies 175 comprising threaded shafts 176 non-rotatably mounted on the rail sections and drive-nuts 178 rotatably mounted in conventional manner at a fixed vertical position and provided with suitable means (not shown) to selectively drive the nuts in one direction or the other to controllably raise and lower the threaded shafts and rail sections.

Alternatively the apparatus for advancing the cartridge-carrying carriages from station to station could be a turntable instead of the rail and wheel arrangement shown. In such alternative, each carriage would be mounted on the turntable for independent vertical motion.

OPERATION

The method according to the present invention is illustrated by the operation of the apparatus of FIGURE 9. Assembled cartridge structures without membranes, such as the cartridge embodiment of FIGURES 1 and 2, are mounted upon a carriage at station 152. The carriage is then moved to station 154 where the cartridge structures are lowered by screw assemblies 175 to dip the exposed portions of the porous sheets of the cartridges in a first bath 173. This is a pretreatment step wherein the porous sheets are treated to prevent impregnation of the membrane-forming liquid into the porous sheet. This anti-impregnation step may merely be a dipping in water whereby the pores of the porous support sheets are prefilled to prevent impregnation by the membrane-forming liquid. In the case of some membrane materials, cellulose acetate, for example, the water pre-treatment not only acts as a physical impediment to impregnation but also acts to precipitate the membrane solution at the water-solution interface. Precipitation of the membrane prevents any substantial further impregnation. For certain membrane materials a more sophisticated anti-impregnation treatment may be necessary, for example a silicon treatment. Further, when a phenolic resin treated paper is used as a porous support, a high phenolic content in the paper inherently causes a phobic relationship with the membrane solution and thus prevents impregnation.

After the pre-treatment step accomplished at station 154, the carriage moves to station 156 where the cartridges are dipped into a bath 174 of a film-forming liquid which may, for example, be a latex, a liquid monomer or polymer, or a solution thereof. The screw jack assemblies are adapted to permit a closely controlled rate of immersion and rate of withdrawal from this bath to ensure proper deposition of the liquid coating on the porous supports. At this dipping station, passageways 164 in the carriage are connected to a conduit 170, and a slight vacuum is applied through conduit 170 and to the effluent spaces of the cartridges and thus to the internal interstices of the porous sheets. From 0.5" to 10" Hg vaccum is preferably applied while the cartridge is being immersed. The vacuum is then reduced to a value of one-half to one-fiftieth of its initial magnitude and is retained while the cartridge is withdrawn. Finally the vacuum is released. In this fashion air bubbles which may tend to form on the surface of the porous sheet as it is dipped into bath 174 will be withdrawn from the surface of the sheet into the interstices and ultimately into conduit 170. Such air bubbles, if permitted to remain, would cause local changes in the separation characteristics of the membrane and also would result in pin holes in the film upon rupture of the thin bubble walls under operating pressures.

Upon completion of the dipping step at station 156 the carriage moves on to station 158 where the now coated cartridges are dipped in a bath 177 which operates to fix the film and establish the desired characteristics of the membrane. A multitude of fixative treatments for newly formed films are known, but one common treatment utilizes water to fix coatings of liquid membrane solutions.

As indicated by dot-dash line 180, an enclosure may be provided to control the atmosphere surrounding the dipped cartridges from the time that they emerge from bath 174 until they are dipped into the fixative bath 175. By such atmospheric control, undesirably rapid drying of the membrane, for example, can be prevented.

It should be noted that post-treatment steps following the fixative bath may be desirable to give the membrane the required separation characteristics. Such treatment may involve several sequential baths for dipping the membrane in different liquids. However, the apparatus of FIGURE 9 has been simplified to show only the fixative bath station, but similar stations would be provided to accomplish such post-treatment operations.

It may be desirable to apply a partial vacuum to the effluent side of the cartridges during the fixative and succeeding post-treatment baths, and for this purpose a vacuum conduit 172 is provided at these stations. The application of such partial vacuum is desirable in a hot water bath, for example, where the higher temperatures vaporize liquids in the membrane and/or in the porous support and thus tend to cause blistering of the membrane away from its support.

Finally, carriage 162 is moved to station 160 at which the cartridges are removed.

It should be noted that drying steps may be incorporated between the various dipping operations. As shown in FIGURE 9, natural air drying is provided during the time the cartridges are between the sequential baths. However, separate drying rail sections or stations may be provided to prolong the drying period and/or a forced air drying system, heated or unheated, may also be provided.

LAMINATE AND SEALING TECHNIQUES

Referring now to FIGURES 5 to 8, these enlarged sectional views show the laminated membrane support construction and several sealing techniques according to the present invention. In the embodiment of FIGURE 5, the porous membrane support is a lamination comprising a central lamina 181 and outer laminae 183. The laminated support extends through impermeable partition 184 to establish fluid communication therethrough. Central lamina 181 serves to transport effluent which has passed through the membrane along the plane of the lamina and through the partition. For this purpose, the central lamina should have maximum voids or open area. Further, as substantial feed pressure is necessary to drive the separation process, the laminated support is subjected to compressive stress between the opposed membranes. Consequently, central lamina 181 must have sufficient compressive strength to prevent collapse of the voids. It has been found that a paper .75 mm. thick and having a density of 0.2 grams per cc. will have the desired properties if treated with phenolic resin.

The outer laminae 183 serve to receive the coating of the membrane-forming liquid, to support the resulting membrane under operating feed pressures, and to transport effluent from the membrane into the central lamina. Phenolic treated paper .25 mm. thick and having a resin-free density of 0.5 gram per cc. has been satisfactorily used in the present invention. Loose fibers of the paper must not protrude from the surface more than about 50% of the membrane thickness (i.e., about .025 to 0.1 mm.) or they will disrupt the continuity of the membrane which is subsequently cast around such fibers. Although pore size of up to 0.2 mm. in the outer lamina will adequately support the membrane in operation, much finer pores (e.g., .05 to .08 mm.) are preferable to prevent excessive impregnation of the porous support by the liquid membrane coating.

The central and outer laminae of the porous support are bonded together to prevent delamination, but the bonding technique must preserve the fluid-conducting capability of the porous support. It has been found that if relatively high (50%) phenolic contents in the paper laminae are utilized in conjunction with relatively low bonding pressures (10 p.s.i.), a successful bond can be accomplished without crushing the voids in the paper.

At the edges of the laminated porous support, a sealing technique is utilized to prevent the membrane-forming liquid from impregnating central lamina 181 and to provide adequate support for the membrane at these edges. As shown in FIGURE 5, seal 185 is applied by brushing, rolling, or dipping a membrane-compatible sealing material across the exposed edges of the laminate. Membrane 190 is subsequently formed over edge seal 185. These seals can be applied to the edge of the laminates before assembly into a cartridge, but it may be preferable to seal these edges after assembly since the edges of adjacent laminates are then aligned and can be sealed simultaneously in a cartridge configuration such as shown in FIGURES 1 and 2.

As shown in FIGURE 5, the cartridge is assembled by inserting the laminated porous sheets in precut slots 182 in an impermeable partition 184. An adhesive 186 is utilized between the porous sheet and the partition to secure these members together. Specifically, adhesive 186 may be dip-coated upon porous sheets 181 before assembly, and then after insertion in slots 182, excess adresive and porous sheet material (indicated by the dot-dash lines) can be trimmed away to open up the effluent passages.

Upon coating with the membrane-forming liquid, membrane 190 is formed on the exposed surfaces of outer laminae 183, seal 185, and adhesive material 186. The adhesive material is appropriately selected not only to secure the porous sheet in the impermeable partition but also to bond with the membrane and thus seal the sheet-partition joint. To exemplify some suitable adhesives, for ionic polymers, cross-linking adhesives such as phenolics and amines are suitable. The room temperature curing characteristics of resorcinol make this a preferred adhesive. When cellulosic, acrylic, or copolymer membranes are involved, a coating of cellulose nitrate on the member with which bonding is desired, will be reactivated even after drying and will effect a good bond with the immersion formed membrane.

In FIGURE 6, a sheet-partition joint is shown wherein the laminated porous support, having central lamina 200 and outer laminae 201, is inserted in impermeable partition 202 without any adhesive agent therebetween. This structure would result for example if the partition were molded or cast about the edges of the laminated sheets. However, in case the required partition material would not properly bond directly with the membrane, an intermediate material 204, which is selected to bond both with the partition material and with the membrane, is applied at the line of intersection between the sheet and the partition. Then upon subsequent dip coating, the resulting membrane 206 forms a bonded overlap upon intermediate material 204.

FIGURE 7 shows the structure of a sheet-partition joint wherein the impermeable partition as well as the porous supports are immersed in the membrane-forming bath. Consequently, a membrane 210 is formed over the surfaces of the laminated porous support 212, 213 and also over the impermeable partition 214. Preferably the partition material is chosen so that the membrane material bonds and seals directly to the partition without the need for an intermediate bonding agent. However, if this is not possible, one of the intermediate material sealing techniques of FIGURE 5, 6, and 8 can be utilized in this configuration.

FIGURE 8 discloses a sheet-partition joint wherein a sealant material 220 has been applied subsequent to the coating of membranes 222 on laminated porous sheets 224, 225 which were preassembled in impermeable partition 226. In this case the membranes 222 are applied to cover the exposed surfaces of sheets 224, 225 to a point closely adjacent the impermeable partition, and then sealant 220 is applied. This technique would be particularly applicable to a cartridge embodiment such as that of FIGURES 1 and 2 wherein a fluid sealant could be applied on the upper surface of header 28, in the position shown in FIGURE 1, and allowed to flow between the adjacent sheets to form a bead of the sealant material 220.

MEMBRANE-FORMING SOLUTIONS

Successful formation of semipermeable membranes in accordance with the present invention is dependent upon selection of membrane solutions having required characteristics. The viscosity of the solution is of major importance. It has been found that a viscosity in the range of 100 to 3500 centipoises is desirable in the present invention. The upper limts on viscosity ensures complete coating of the porous support members when the cartridge is immersed and ensures proper drainage of excess solution upon withdrawal of the cartridge from the dipping bath. The low end of the viscosity range is dictated by the difficulty of forming membranes having proper rejection characteristics from very thin solutions and by the requirement that the membrane solution does not impregnate the pores of the support members extensively. It should be noted that in the prior art techniques of membrane formation, such as casting with a draw bar on glass, much higher viscosity casting solutions are conventionally utilized.

In the present invention, the viscosity is controlled by solution strength and by appropriate choice of solvents. This control of the dipping solution is illustrated by the following example. A membrane suitable for desalination has successfully been cast using conventional prior art techniques from a solution containing 25% cellulose acetate, 25% formamide, and 50% acetone. The membrane was glass cast, dried for one minute, and then washed. The viscosity of such a solution is far too high to successfully use in immersion casting procedures of this invention. Therefore, the solution was changed to contain 19% cellulose acetate, 27% formamide, and 54% acetone. The latter solution having a lower viscosity was successfully dip cast to produce a desalination membrane having similar properties.

It should also be noted that the wetting characteristics of some prior art membrane solutions are unsatisfactory for dip casting techniques because of excessive impregnation of the porous support sheet. For example, a HCl-dioxane-water solution of an ionic resin, such resin being described in U.S. patent application 341,834 filed January 1964, presents such a problem. However, by changing to a HCl-ethanol-water solution, ionic resin membranes of similar characteristics can be produced without the wetting problems of the prior art solution.

Other examples of materials known to be capable of forming selectively permeable membranes are cellulose and cellulose esters, acrylics, PVA, protein resins, nylon, urea, and melamine formaldehyde. Such known materials can be utilized in forming membranes in accordance with the present invention.

In summary it can be seen that the present invention provides for low cost membrane separation structures wherein the manipulative assembly steps of the structure are accomplished prior to the application of the delicate membrane surfaces. In this manner the membranes themselves are protected without time-consuming and expensive care and skill being required in the assembly operations. Further, the product of the present invention obviates the "high stress point" disadvantages characteristic of the sealing techniques utilized in prior art cartridge configurations. Finally, the present inventive teachings provide for cartridges which can be reused by removing a plugged membrane surface and replacing it with a newly deposited surface without diassembly of the membrane cartridge.

As this invention may be embodied in several forms without departing from the spirit or essential characteristics thereof, the embodiments described above are merely illustrative of such invention.

I claim:
1. A method for making membrane separation units comprising the steps of:
   (a) structurally combining a plurality of porous support members having fluid-conducting interstices with an impermeable partition in such relationship that the support members are disposed in closely spaced relation on one side of the partition with a portion of each support member extending through the partition to communicate with the space on the other side thereof and further disposed to permit drainage of a liquid from the spaces between adjacent support members;
   (b) and subsequently temporarily immersing the porous support members in a selectively-permeable-membrane-forming liquid to create continuous membranes adhering to the surfaces of the support members on said one side of the partition.

2. A method for making a membrane separation unit comprising the steps of:
   (a) submerging a preassembled plurality of closely spaced porous members formed of a material having internally interconnected interstices into a bath of a membrane-forming liquid having a viscosity of between 100 and 3500 centipoises;

(b) withdrawing the assembly from the bath with a coating of the liquid in intimate contact with the surfaces of the members thereof;

(c) and treating the deposited coating to form a selectively-permeable membrane adhering to the surfaces of the members.

3. A method for making membrane separation units comprising the steps of:

(a) structurally combining a plurality of porous fluid-conducting support members with an impermeable partition in such relationship that the support members are disposed in closely spaced relation on one side of the partition with a portion of each support member extending through the partition to communicate with the space on the other side thereof and further disposed to permit drainage of a liquid from the spaces between adjacent support members;

(b) subsequently temporarily immersing the porous support members in a selectively-permeable-membrane forming liquid to create continuous membranes adhering to the surfaces of the support members on said one side of the partition;

(c) and applying a partial vacuum to the interior of the porous support members during said immersing step.

4. A method as defined in claim 3 wherein said step of applying a partial vacuum is accomplished by subjecting the interior of the porous support members to a predetermined partial vacuum during immersion and by reducing said partial vacuum to one-half to one-fiftieth of the predetermined value during withdrawal from the immersion.

5. A method for making membrane separation units comprising the steps of:

(a) structurally combining a plurality of porous fluid-conducting support members with an impermeable partition in such relationship that the support members are disposed in closely spaced relation on one side of the partition with a portion of each support member extending through the partition to communicate with the space on the other side thereof and further disposed to permit drainage of a liquid from the spaces between adjacent support members;

(b) subsequently temporarily immersing the porous support members in a selectively-permeable-membrane forming liquid to create continuous membranes adhering to the surfaces of the support members on said one side of the partition;

(c) and treating the coated porous support members in at least one bath of a membrane-treating fluid while applying a partial vacuum to the interior of the porous support members.

6. A method for making a membrane separation unit comprising the steps of:

(a) submerging a preassembled plurality of closely spaced members formed of a material having internally interconnected interstices into a bath of a membrane forming liquid having a viscosity of between 100 and 3500 centipoises;

(b) withdrawing the assembly from the bath with a coating of the liquid in intimate contact with the surfaces of the members thereof;

(c) treating the deposited coating to form a selectively-permeable membrane adhering to the surfaces of the members;

(d) and applying a partial vacuum of between 0.5″ and 10″ Hg to the interstices of the members during said submerging step.

7. A method for making immersion-coated membrane separation structures comprising the steps of:

(a) assembling a laminated membrane-supporting structure by securing porous membrane-supporting outer laminae upon the opposite surfaces of a porous central core lamina adapted to conduct an effluent along the plane thereof, said outer laminae having relatively fine pores therein to permit effluent to pass transversely to the plane of the laminae while inhibiting impregnation of a membrane-forming liquid into the outer laminae;

(b) immersing the laminated membrane-supporting structure in a membrane-forming liquid;

(c) draining excess liquid from the laminated structure thereby leaving a coating of the liquid on the outer surfaces of the outer laminae;

(d) and treating the coated structure to fix the coating to form in situ a selectively permeable membrane adhering to the porous membrane-supporting structure.

8. A method as defined in claim 7 said step of immersing being performed with a bath of selectively-permeable-membrane-forming liquid having a viscosity of between 100 and 3500 centipoises.

9. A method as defined in claim 7 together with the step of pretreating the porous support structures to further inhibit impregnation by the membrane-forming liquid.

10. A method for making immersion-coated membrane separation units comprising the steps of:

(a) assembling laminated membrane-supporting structures by bonding porous, membrane-supporting outer laminae upon the opposite surfaces of a porous central core lamina adapted to conduct an effluent along the plane thereof, said outer laminae having relatively fine pores therein to permit effluent flow therethrough while inhibiting impregnation by a membrane-forming liquid;

(b) integrating a plurality of the laminated structures in parallel spaced relation on one side of an impermeable partition with an edge of each laminated structure extending through the partition to establish fluid communication therethrough;

(c) immersing the integrally stacked membrane-supporting structures in a membrane-forming liquid to form membranes on the exposed surfaces of the outer laminae on said one side of the partition.

11. A method as defined in claim 10 wherein phenolic resin treated paper having at least a 50% resin content is utilized for the core and outer laminae, and wherein said assembly step includes the step of bonding the outer laminae to the core lamina by application of heat and a bonding pressure of not more than 10 pounds per square inch whereby collapse of the pores of the paper laminae is prevented.

12. A method as defined in claim 10 together with the step of applying a sealing material around the circumference of the intersection of the porous support structures and the partition, the sealing material being selected to bond with the partition and with the membranes.

13. A method as defined in claim 12 wherein said step of applying sealing material is accomplished prior to said step of immersing.

References Cited

UNITED STATES PATENTS

| | | | |
|---|---|---|---|
| 2,926,104 | 2/1960 | Goetz | 117—157 X |
| 2,987,472 | 6/1961 | Kollsman | 210—321 X |
| 3,113,883 | 12/1963 | James | 117—119 X |
| 3,198,865 | 8/1965 | Porter et al. | 210—497 X |

JOHN T. GOOLKASIAN, Primary Examiner

R. A. KILLWORTH, Assistant Examiner

U.S. Cl. X.R.

117—59, 76, 119, 157; 156—286, 335; 210—321, 497